United States Patent [19]

Woodson et al.

[11] 4,396,526

[45] Aug. 2, 1983

[54] ORGANIC HYDROPEROXIDE CATALYST SYSTEM

[75] Inventors: Wayne D. Woodson; Patrick H. Stewart, both of Danville, Ill.

[73] Assignee: CL Industries, Inc., Danville, Ill.

[21] Appl. No.: 204,330

[22] Filed: Nov. 5, 1980

[51] Int. Cl.$^3$ .................. C07C 179/2; C08K 5/14; C08F 4/38

[52] U.S. Cl. .................. 252/186.22; 106/382; 164/16; 568/564; 568/568; 568/578; 252/186.26; 252/186.29

[58] Field of Search ............. 252/186, 186.22, 186.26, 252/186.29; 568/564, 560, 578; 106/38.2; 164/16

[56] References Cited

U.S. PATENT DOCUMENTS

| | | | |
|---|---|---|---|
| 3,008,205 | 11/1961 | Blaies | 164/16 |
| 3,020,609 | 2/1962 | Brown et al. | 164/21 |
| 3,059,297 | 10/1962 | Dunn et al. | 164/21 |
| 3,108,340 | 10/1963 | Peters et al. | 164/16 |
| 3,145,438 | 8/1964 | Kottke et al. | 164/16 |
| 3,184,814 | 5/1965 | Brown | 164/12 |
| 3,639,654 | 2/1972 | Robins | 164/16 |
| 3,879,339 | 4/1975 | Richard | 164/16 |
| 4,267,387 | 5/1981 | Imai et al. | 568/568 |
| 4,311,627 | 1/1982 | Hutchings | 164/21 X |

FOREIGN PATENT DOCUMENTS

| | | |
|---|---|---|
| 45495/72 | 8/1972 | Australia . |
| 2451359 | 4/1975 | Fed. Rep. of Germany ...... 568/568 |
| 1225984 | 3/1971 | United Kingdom . |

*Primary Examiner*—Irwin Gluck

*Attorney, Agent, or Firm*—Maky, Renner, Otto & Boisselle

[57] ABSTRACT

A peroxide system or composition for use in resin polymerization consists of 1,4-diisopropylbenzene monohydroperoxide dissolved in an organic solvent which is a solvent for hydrogen peroxide and 1,4-diisopropylbenzene dihydroperoxide. The peroxide composition is characterized by its storage stability, resistance to detonation, low flammability, ease of handling and improved catalytic properties in the polymerization of certain resins. The preferred peroxide, based on economic considerations, is a crude diisopropylbenzene hydroperoxide mixture comprising a major amount of 1,4-diisopropylbenzene monohydroperoxide and a minor amount of 1,4-diisopropylbenzene dihydroperoxide, together with solvents and unreacted materials obtained as a byproduct in the commercial manufacture of p-diisopropylbenzene dihydroperoxide. A particularly stable and useful composition consists of about 20% solvent, preferably cyclohexanone, and 80% of a mixture consisting of a major part of crude diisopropylbenzene hydroperoxide and a minor part of hydrogen peroxide. This peroxide composition, and the 1,4-diisopropylbenzene monohydroperoxide, or the crude diisopropylbenzene hydroperoxide, are soluble in or miscible with furfuryl alcohol-formaldehyde resin prepolymers. The peroxide composition and the resin prepolymer are added to sand, formed into cores or molds, and gassed with sulfur dioxide, and optionally purged with air, at a temperature from room temperature to about 300° F. for a time a fraction of a second to several minutes to form superior sand cores and molds.

9 Claims, No Drawings

ORGANIC HYDROPEROXIDE CATALYST SYSTEM

BACKGROUND OF THE INVENTION

1. Field of the Invention

This invention relates to new and useful improvements in peroxide compositions for use in resin polymerization and to methods of using such compositions.

2. Description of the Prior Art

In the foundry industry, sand is coated with resin binders and formed into molds and cores for the production of precision castings. A wide variety of techniques has been developed for the manufacture of sand cores and molds. These involve the hot box technique for mold and core formation; the shell method; the "No-Bake," and the cold-box technique.

In the hot box and shell methods, sand molds and cores are formed by heating a mixture of sand with a thermosetting resin at a temperature of about 300°–600° F. in contact with patterns which produce the desired shape for the mold or core. The resin is polymerized and a core or mold is formed. Procedures of this type are described in Dunn et al. U.S. Pat. No. 3,059,297 and Brown et al. U.S. Pat. No. 3,020,609.

A particular disadvantage of the hot box and shell methods is the necessity for heating the pattern boxes to 300°–600° F. to polymerize and cure the resin binder. This involves considerable expense and is generally a high cost technique.

The cold box technique for core and mold formation involve the use of sand mixed or coated with resins which may be cured at room temperature by acid or base catalysis. Acid or base catalysts have been used in liquid, solid or gaseous form. Typical cold box processes are shown in Blaies U.S. Pat. No. 3,008,205; Dunn et al. U.S. Pat. No. 3,059,297; Peters et al. U.S. Pat. No. 3,108,340; Kottke et al. U.S. Pat. No. 3,145,438; Brown et al. U.S. Pat. No. 3,184,814; Robins U.S. Pat. No. 3,639,654; Australian Pat. No. 453,160 and British Pat. No. 1,225,984. Many of these processes involve the use of sulfur-containing acid catalyst such as benzene sulfonic acid, toluene sulfonic acid and the like.

A few years ago, a process was developed for room temperature polymerization of condensation resin in which an acid-curing agent is generated in situ in the resin or on a sand-resin mix. It had previously been suggested in U.S. Pat. No. 3,145,438 to inject $SO_3$ in a form of a gas into a mixture of sand and resin to cure the resin at room temperature. It was found, however, that this process causes an instantaneous curing of the resin in the region subjected to treatment by $SO_3$ which impedes the diffusion of this gas to other parts of the resin, particularly the central parts of the mixture. Subsequently, a method was developed which avoided this difficulty. In Richard U.S. Pat. No. 3,879,339, it is disclosed that sand may be coated with a suitable oxidizing agent, such as an organic peroxide, and coated with the resin to be used in binding the sand into the form of a core or mold. The sand-resin mixture is then formed into suitable shape and treated with gaseous $SO_2$. The $SO_2$ is oxidized, in situ, to $SO_3$ and converted to sulfur-containing acid by water present in the mixture. The sulfur-containing acid which is generated in situ causes a rapid and uniform polymerization of the resin at room temperature. This process has proved successful commercially and is applicable to phenolic resins, furan resins, and urea-formaldehyde resins, as well as mixtures and copolymers thereof.

In the cold box method of Richard U.S. Pat. No. 3,879,339, there are a large variety of peroxides disclosed which may be added to sand along with resins which are used in forming sand cores or molds. This composition is subsequently formed into shape and treated with gaseous $SO_2$. The peroxides which are disclosed in the Richard patent are mostly quite expensive and, in many cases, are difficult to handle and to ship or transport. Organic peroxides require special approval for transportation in interstate commerce. Organic peroxides are often highly flammable or present other fire hazards. Organic peroxides also are often shock sensitive and may be explode or detonate under certain conditions. As a result, any and all organic peroxides can not be used in the Richard process because of economic and safety considerations.

SUMMARY OF THE INVENTION

One of the objects of this invention is to provide a new and improved storage stable, easily transportable, non-detonating organic peroxide composition for use as a catalyst component in the polymerization of resins.

Another object of this invention is to provide an improved organic peroxide composition including a solvent which is a cosolvent for the organic peroxide and hydrogen peroxide.

Another object of this invention is to provide an improved organic peroxide composition comprising a solution of 1,4-diisopropylbenzene monohydroperoxide or crude diisopropylbenzene hydroperoxide in a solvent, optionally including a small amount of hydrogen peroxide.

Another object of this invention is to provide an improved resin composition comprising a furfuryl alcohol-formaldehyde resin prepolymer having a minor amount of a peroxide composition containing 1,4-diisopropylbenzene monohydroperoxide, dissolved therein.

Another object of this invention is to provide an improved method of forming sand cores or molds wherein a major amount of sand is mixed with a minor amount of 1,4-diisopropylbenzene monohydroperoxide and a furfurylalcohol-formaldehyde prepolymer, forming the mixture into the shape of a core or mold and gasing the mixture with sulfurdioxide at a relatively low temperature.

Other objects of this invention will become apparent from time to time throughout the specification and claims as hereinafter related.

The above objectives are attained as described below. A peroxide system or composition for use in resin polymerization consists of 1,4-diisopropylbenzene monohydroperoxide dissolved in an organic solvent which is a solvent for hydrogen peroxide and 1,4-diisopropylbenzene dihydroperoxide. The peroxide composition is characterized by its storage stability, resistance to detonation, low flammability, ease of handling and improved catalytic properties in the polymerization of certain resins. The preferred peroxide, based on economic considerations, is a crude mixture, called crude diisopropylbenzene hydroperoxide, of a major amount of 1,4-diisopropylbenzene monohydroperoxide and a minor amount of 1,4-diisopropylbenzene dihydroperoxide, together with solvents and unreacted materials obtained as a byproduct in the commercial manufacture of p-diisopropylbenzene dihydroperoxide. A particularly stable and useful composition consists of about 20% solvent, preferably cyclohexanone, and 80% of a mixture consisting of a major part of crude diisopropylbenzene hydroperoxide and a minor part of hydrogen peroxide. This peroxide composition, and the 1,4-diisopropylbenzene monohydroperoxide, or the crude diisopropylbenzene hydroperoxide, are soluble in or miscible with furfuryl alcohol-formaldehyde resin prepolymers. The peroxide composition and the resin prepolymer are added to sand, formed into cores or molds, and gassed with sulfur dioxide at a temperature from room temperature to about 300° F. for a time from a few seconds to several minutes to form superior sand cores and molds.

DESCRIPTION OF THE PREFERRED EMBODIMENTS

This invention is directed to an improved peroxide composition which is particularly useful in the process of Richard U.S. Pat. No. 3,879,339. The peroxide composition consists of a solution or mixture of 1,4-diisopropylbenzene monohydroperoxide or a crude composition containing 1,4-diisopropylbenzene monohydroperoxide and 1,4-diisopropylbenzene dihydroperoxide, called crude diisopropylbenzene hydroperoxide, with a solvent which results in a stable system. It should be noted that, for the purposes of this invention, 1,4-diisopropylbenzene monohydroperoxide is effective but 1,4-diisopropylbenzene dihydroperoxide is less effective in the process of Richard U.S. Pat. No. 3,879,339. The presence of 1,4-diisopropylbenzene dihydroperoxide in admixture with 1,4-diisopropylbenzene monohydroperoxide is therefore as an undesired contaminate. The term "crude diisopropylbenzene hydroperoxide" is used hereinafter is intended to mean a composition substantially as defined above.

CRUDE DIISOPROPYLBENZENE HYDROPEROXIDE

In the commercial manufacture of p-diisopropylbenzene dihydroperoxide, an organic peroxide composition is obtained as a byproduct known in the trade as crude diisopropylbenzene hydroperoxide and consisting essentially of 1,4-diisopropylbenzene dihydroperoxide; 1,4-diisopropylbenzene monohydroperoxide; a-hydroxy,a-hydroperoxy diisopropyl benzene; a-hydroxy,diisopropyl benzene; and p-diisopropyl benzene.

One particular crude diisopropylbenzene hydroperoxide composition which was found to be useful had approximately the following composition:

| | |
|---|---|
| 55.9% | 1,4-diisopropylbenzene monohydroperoxide |
| 11.0% | 1,4-diisopropylbenzene dihydroperoxide |
| 10.0% | diisopropylbenzene |
| 0.44% | benzene |
| 1.5% | Water |
| 21% | Mixture of 1-isopropyl-4-isopropanol benzene, 1,4-diisopropyl benzene, 1-isopropanol-4-isopropylbenzene hydroperoxide, and p-benzene dipropenoic acid disodium salt. |

The stated percentages, as used herein, are by weight based on total composition unless otherwise stated.

Solvents which are useable in preparing stable peroxide compositions in accordance with this invention are organic solvents which are cosolvents for 1,4-diisopropylbenzene monohydroperoxide, 1,4-diisopropylbenzene dihydroperoxide and hydrogen peroxide. Solvents which are particularly useful are methanol, cyclohexanone, glycol ethers (but not glycols), furfuryl alcohol, diisopropyl benzene (in compositions not containing hydrogen peroxide), dioxane and phenol. Such solvents will dissolve mixtures of 1,4-diisopropylbenzene monohydroperoxide and 1,4-diisopropylbenzene dihydroperoxide, such as crude diisopropylbenzene hydroperoxide and are cosolvents for hydrogen peroxide.

The proportions of organic peroxides and solvents in the following Examples are for purposes of illustration only. The peroxides may be mixed with any of the specified types of solvents at suitable proportions within the range of solubilities therein. Generally, the peroxides are present in an amount sufficient to provide a desired level of Active Oxygen in the composition, preferably about 6-8%. The composition may be prepared with or without the hydrogen peroxide but generally it is best to include the hydrogen peroxide. A level of about 80% of a mixture of crude diisopropylbenzene hydroperoxide and hydrogen peroxide in one of the specified solvents will produce the desired amount of Active Oxygen. If substantially pure 1,4-diisopropylbenzene monohydroperoxide is used in the composition, it will produce the desired amount of Active Oxygen at a much lower concentration therein. Likewise, increasing the amount of hydrogen peroxide may permit some decrease in the amount of the organic peroxide used. The concentration of hydrogen peroxide can not be increased very much without exceeding safety limits.

A series of peroxide solutions or compositions were prepared and tested for stability and safety and were subsequently tested in the polymerization of resins.

EXAMPLE I

A peroxide composition was prepared having the following composition:

| | |
|---|---|
| 68% | crude diisopropylbenzene hydroperoxide |
| 21% | cyclohexanone |
| 11% | 70% hydrogen peroxide |

It should be noted that the amount of solvent in this composition is somewhat critical. If the proportion of cyclohexanone is decreased below about 19% some of the ingredients begin to drop out of solution.

This composition was tested by the Association of American Railroads, Bureau of Explosives and was found to be satisfactory for safe transportation. A portion of the composition was maintained at 75° C. under a water reflux condensor for 48 hours. It did not ignite or undergo marked decomposition.

A portion of the sample contained in a plastic cup was initiated with a number 8 electric blasting cap, it did not explode or ignite. The same results were obtained when the same test was conducted using 120 ml. of the sample absorbed in eight grams of cotton.

A portion of the sample was placed on a kerosene-soaked sawdust bed and ignited with a burning fusee. When the fire reached the test portion, it burned only moderately.

One gallon of the sample contained in a one gallon metal can with a friction-sealed lid was heated on a kerosene/wood fire. The lid opened partially six minutes after the kerosene/wood was ignited. The material was ignited and burned with a black smoke for about five minutes. The flame height was about 40–50 feet.

The flash point of this sample was determined to be 174° F. using the SETA Closed-Cup Flash Point Tester.

In a burning test, the sample could be ignited with a match and burned with a maximum flame height of eighteen inches. In a pressure vessel test, the rupture disc failed to burst with the vent hole opening of one mm in diameter. In an impact test, the sample failed consistently to explode or ignite in the Bureau of Explosives Impact Apparatus under a drop height of ten inches when the sample was tested alone or absorbed in filter paper. In a Rapid Heat Test, the sample boiled at 105° C.–175° C., left about half of the sample behind. The color of the material turned darker as the temperature increased. The remained dark yellow material turned to a redish-orange color at 187° C., then turned to brown color at 310° C. No further reaction was observed up to 325° C. In a SADT Test, no exothermic reaction was observed for seven days with one gallon of the same sample contained in a plastic bottle was tested at 130° F. however, the color of the material turned brown.

Based the above test results, the Bureau of Explosives recommendation was that the composition to be described as 1,4-diisopropylbenzene monohydroperoxide solution, not over 60% and classed as Organic Peroxide under DOT regulations. This material is considered safe and transportable.

The peroxide composition of this example has an Active Oxygen content of about 7.8–8.0%. After storage at 130° F. for one week, Active Oxygen decreases by about 0.3%. This composition is stable for an indefinite period of time at temperatures near 0° F. This composition is usable in resin polymerization, as described below.

EXAMPLE II

A peroxide composition was prepared as follows:

| 67.20% | crude diisopropylbenzene hydroperoxide |
|---|---|
| 20.60% | cyclohexanone |
| 1.96% | methenol |
| 10.24% | 70% hydrogen peroxide |

This formulation is stable under the same conditions discussed in connection with Example I. The Active Oxygen content of this composition is about 7.8–8.0%. After storage at 130° F. for one week, Active Oxygen decreases by about 0.3%. This blend is stable for an indefinite period at temperatures near 0° F. This composition can be used in the polymerization of resins as described below.

EXAMPLE III

A peroxide composition was prepared as follows:

| 69% | crude diisopropylbenzene hydroperoxide |
|---|---|
| 10% | cyclohexanone |
| 10% | dipropyleneglycol |
| 11% | 70% hydrogen peroxide |

This formulation is stable under the same conditions discussed in connection with Examples I and II. The Active Oxygen content of this composition is about 7.8–8.0%. After storage at 125° F. for 30 days, Active Oxygen decreases by about 0.4%. This blend is stable for an indefinite period at temperatures near 0° F. This composition can be used in the polymerization of resins as described below.

EXAMPLE IV

A peroxide composition is prepared as follows:

| 40% | 1,4-diisopropylbenzene monohydroperoxide |
|---|---|
| 50% | cyclohexanone |
| 10% | 70% hydrogen peroxide |

This formulation is stable under the same conditions discussed in connection with Examples I and II. The Active Oxygen content of this composition is about 5.8–6.0%. After storage at 130° F. for 7 days, Active Oxygen decreases by about 0.3%. This blend is stable for an indefinite period at temperatures near 0° F. This composition can be used in the polymerization of resins as described below.

EXAMPLE V

A peroxide composition is prepared as follows:

| 50% | 1,4-diisopropylbenzene monohydroperoxide |
|---|---|
| 50% | diisopropylbenzene |

This formulation is stable under the same conditions discussed in connection with Examples I and II. The Active Oxygen content of this composition is somewhat lower than the other compositions, but it high enough to be effective. After storage at 130° F. for 7 days, Active Oxygen decreases by about 0.3%. This blend is stable for an indefinite period at temperatures near 0° F. This composition can be used in the polymerization of resins as described below.

EXAMPLE VI

Solubility of Peroxide Composition in Resin

It was found unexpectedly that the above peroxide compositions are soluble in and form stable mixtures with furfurylalcohol-formaldehyde resin prepolymers. A solution of 35% crude diisopropylbenzene hydroperoxide and 65% furfurylalcohol-formaldehyde resin prepolymer was prepared and stored for six weeks at 105° F. At the end of this time, the blend showed no performance loss when polymerized to form sand cores or molds. A similar result is obtained when 1,4-diisopropylbenzene monohydroperoxide is blended with the resin prepolymer. In comparison, it had previously been found that methyl ethyl ketone peroxide was not stable when mixed with furfurylalcohol-formaldehyde resin prepolymer even at room temperature.

Use of Organic Peroxides in Resin Polymerization

The organic peroxide compositions described above are unexpectedly superior in stability and resistance to detonation which makes them easier to transport, store and use. These peroxide compositions are unexpectedly superior to methyl ethyl ketone peroxide (which has been the standard peroxide for resin polymerization by the $SO_2$ gassing process) for the polymerization of furfuryl alcohol-formaldehyde resin prepolymers by the $SO_2$ gassing process although they are not effective in the polymerization of phenolics by such a process.

EXAMPLE VII

A foundry-grade sand was mixed with 1.25% wt. (based on the sand) of a furfurylalcohol-formaldehyde resin prepolymer and mulled for three minutes. Next, 50-55% wt. (based on the resin weight) of the peroxide composition of EXAMPLE I was added and the mixture mulled for an additional three minutes. The sand/resin/peroxide mix was then rammed or blown into a mold and gassed with $SO_2$ for about 1.0 seconds at room temperature, followed by an air purge. Gassing times of about 0.5 seconds to about 5 minutes and temperatures from room temperature to about 300° F. can be used. The product obtained after 20 seconds, as described above, is capable of being handled immediately. This product has better hardness than a like product made using methyl ethyl ketone peroxide. Core strengths of 200 after 30 minutes and 273 after 24 hours are substantially higher than are obtained using methyl ethyl ketone peroxide, viz, 185 after 30 minutes and 218 after 24 hours, respectively.

EXAMPLE VIII

A different foundry-grade sand was mixed with 1.25% wt. (based on the sand) of a furfurylalcohol-formaldehyde resin prepolymer and mulled for three minutes. Next, 50-55% wt. (based on the resin weight) of the peroxide composition of EXAMPLE II was added and the mixture mulled for an additional three minutes. The sand/resin/peroxide mix was then rammed or blown into a mold and gassed with $SO_2$ for about 1.0 seconds at room temperature, followed by an air purge. Gassing times of about 0.5 seconds to about 5 minutes and temperatures from room temperature to about 300° F. can be used. The product obtained after 20 seconds, as described above, is capable of being handled immediately. This product has better hardness than a like product made using methyl ethyl ketone peroxide. Core strength 444 after 24 hours was substantially higher than is obtained using methyl ethyl ketone peroxide, viz, 386 after 24 hours.

EXAMPLE IX

A foundry-grade sand was mixed with 1.25% wt. (based on the sand) of a furfurylalcohol-formaldehyde resin prepolymer and mulled for three minutes. Next, 50-55% wt. (based on the resin weight) of the peroxide composition of EXAMPLE III was added and the mixture mulled for an additional three minutes. The sand/resin/peroxide mix was then rammed or blown into a mold and gassed with $SO_2$ for about 1.0 seconds at room temperature, followed by an air purge. Gassing times of about 0.5 seconds to about 5 minutes and temperatures from room temperature to about 300° F. can be used. The product obtained after 20 seconds, as described above, is capable of being handled immediately. This product has better hardness than a like product made using methyl ethyl ketone peroxide. Core strengths of 210 after 30 minutes and 338 after 24 hours are substantially higher than are obtained using methyl ethyl ketone peroxide, viz, 185 after 30 minutes and 218 after 24 hours, respectively.

EXAMPLE X

A foundry-grade sand was mixed with 1.25% wt. (based on the sand) of a furfurylalcohol-formaldehyde resin prepolymer and mulled for three minutes. Next, 50-55% wt. (based on the resin weight) of the peroxide composition of EXAMPLE VI was added and the mixture mulled for an additional three minutes. The sand/resin/peroxide mix was then rammed or blown into a mold and gassed with $SO_2$ for about 1.0 seconds at room temperature, followed by an air purge. Gassing times of about 0.5 seconds to about 5 minutes and temperatures from room temperature to about 300° F. can be used. The product obtained after 20 seconds, as described above, is capable of being handled immediately. This product has better hardness than a like product made using methyl ethyl ketone peroxide. Core strengths after 30 minutes and after 24 hours are substantially higher than are obtained using methyl ethyl ketone peroxide.

Similar results are obtained when the peroxide composition of EXAMPLE IV is used in the same test procedure.

EXAMPLE XI

A foundry-grade sand was mixed with 1.9% wt. (based on the sand) of a furfurylalcohol-formaldehyde resin prepolymer-peroxide blend of the composition of EXAMPLE VII and mulled for three minutes. Next, 10% wt. (based on the resin weight) of 50% hydrogen peroxide was added and the mixture mulled for an additional three minutes. The sand/resin/peroxide mix was then rammed or blown into a mold and gassed with $SO_2$ for about 1.0 seconds at room temperature, followed by an air purge. Gassing times of about 0.5 seconds to about 5 minutes and temperatures from room temperature to about 300° F. can be used. The product obtained after 20 seconds, as described above, is capable of being handled immediately. This product has better hardness than a like product made using methyl ethyl ketone peroxide added separately (the mixture is not stable). The core strength of 254 after 30 minutes is substantially higher than is obtained using methyl ethyl ketone peroxide added separately, viz, 185 after 30 minutes.

This procedure was repeated under a number of different conditions and in some cases satisfactory results are obtained using the resin-peroxide blend without the addition of hydrogen peroxide to the composition.

While this invention has been described fully and completely with emphasis upon several preferred embodiments, it should be understood that, within the scope of the appended claims, this invention may be practiced otherwise than as specifically described herein.

We claim:

1. A storage stable, non-detonating organic peroxide composition for use as a catalyst component in the polymerization of resins, comprising a mixture of 1,4-diisopropylbenzene monohydroperoxide and a minor amount of hydrogen peroxide, sufficient to yield an active oxygen content of 6-8% in the mixture, dissolved in an equal or lesser amount of an organic solvent which is a solvent for substantial amounts of both hydrogen peroxide and 1,4-diisopropylbenzene dihydroperoxide.

2. A composition according to claim 1 in which 1,4-diisopropylbenzene monohydroperoxide is present as a mixture of a major amount of 1,4-diisopropylbenzene monohydroperoxide and a minor amount of 1,4-diisopropylbenzene dihydroperoxide.

3. A composition according to claim 1 in which said solvent is methanol, a glycolether, cyclohexanone, furfurylalcohol, or dioxane.

4. A composition according to claim 1 or 3 in which 1,4-diisopropylbenzene monohydroperoxide is present as crude diisopropylbenzene hydroperoxide.

5. A composition according to claim 1 or 3 including
a minor amount of hydrogen peroxide and in which 1,4-diisopropylbenzene monohydroperoxide is present as crude diisopropylbenzene hydroperoxide.

6. A composition according to claim 3 consisting essentially of
a major amount of crude diisopropylbenzene hydroperoxide and a minor amount of hydrogen peroxide dissolved in said solvent.

7. A composition according to claim 6 in which
said solvent is present in substantially the minimum amount required to keep both crude diisopropylbenzene hydroperoxide and hydrogen peroxide in solution.

8. A composition according to claim 7 in which
said solvent is cyclohexanone, present in an amount not less than 19% wt. based on the total composition, and the remainder of the composition consists essentially of a mixture of a major amount of crude diisopropylbenzene hydroperoxide and a minor amount of hydrogen peroxide.

9. A composition according to claim 6 consisting essentially of
about 20% solvent by wt. of total composition, and about 80% by wt. of total composition of peroxides comprising a major amount of crude diisopropylbenzene hydroperoxide and a minor amount of hydrogen peroxide.

* * * * *